Sept. 20, 1971 J. H. LEMELSON 3,605,909
TOOLING MACHINE HAVING SURFACE SENSING PROGRAM STARTING
Filed Nov. 15, 1968 2 Sheets-Sheet 1

INVENTOR.
JEROME H. LEMELSON

United States Patent Office 3,605,909
Patented Sept. 20, 1971

3,605,909
TOOLING MACHINE HAVING SURFACE SENSING PROGRAM STARTING
Jerome H. Lemelson, 85 Rector St.,
Metuchen, N.J. 08840
Continuation-in-part of application Ser. No. 294,076, July 10, 1963, now Patent No. 3,481,042, which is a continuation-in-part of application Ser. No. 250,942, Jan. 11, 1963, now Patent No. 3,188,947, which in turn is a continuation-in-part of application Ser. No. 518,616, Jan. 4, 1966, now Patent No. 3,476,481. This application Nov. 13, 1968, Ser. No. 775,433
Int. Cl. B23b 39/08; G06f 15/46
U.S. Cl. 173—3                                    17 Claims

ABSTRACT OF THE DISCLOSURE

An apparatus and method are provided for operating on material by means of an automatically controlled tool and work requiring prepositioning of the tool and work surface. In one form surface-sensing means is mounted on or adjacent the tool for sensing the location of the work surface which, upon being detected thereby, either initiates an automatic cycle of operation or provides a feedback signal which is operative to correct the automatic control means or compensate for variations in the location of the surface of the work piece and the tool from one work piece to the next.

Figure 1:
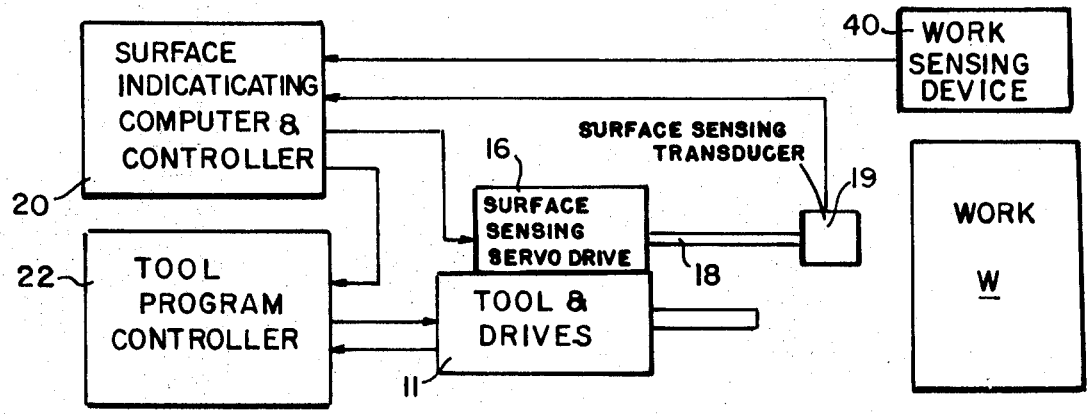

Locating the surface of the work is effected either by means of a movable probe mounted on the tool head or tool manipulator and operative to be driven into engagement with or sensing relationship with the work, or by means of locating the sensing transducer on or adjacent the tool itself which is moved to permit the transducer to sense the surface of the work prior to initiating an automatic operational cycle. In another form, the tool itself is energized to define the surface-sensing transducer and relative movement of the work and tool is effected to permit location of the work surface by the tool.

RELATED APPLICATIONS

This is a continuation-in-part of copending application Ser. No. 294,076 filed July 10, 1963, now Patent No. 3,481,042 for Surface Sensing Apparatus which was a continuation-in-part of application Ser. No. 250,942 filed Jan. 11, 1963, now Patent No. 3,188,947 and having as a parent application Ser. No. 477,467 filed Dec. 24, 1954, now abandoned. This is also a continuation-in-part of copending application Ser. No. 518,616 filed Jan. 4, 1966, now Patent No. 3,476,481 for Automatic Measurement System.

SUMMARY OF THE INVENTION

This invention relates to an automatic apparatus and method for automatically controlling a machine tool to perform preprogrammed operations on work having one or more surfaces located adjacent the tool but variable in location from work piece to work piece as a result of variations in dimensions of the work piece, variations in the relative location of the work piece, or work piece holder and the manipulation means for the tool or variations in the shape of the work piece.

It is known in the art to perform preprogrammed operations such as machining operations on a unit of work by securing the work to a work table or fixture which is predeterminately located or comprises part of a machine tool and thereafter cyclically or program control operation and movement of the tool and, in certain instances, movement of the work to cause the tool to predeterminately machine or otherwise affect the work. Such operations are either effected after establishing a base or datum location between the work and tool as a result of proper fixturing and the provision of a predetermined datum plane or base associated with the work such as a surface thereof, holes therein or the like or by controlling the dimensions of the work within a given tolerance range and predeterminately locating said work so that the surface to be machined falls within the predetermined tolerance relative to the tool whereby variations in the dimension of the work surface are compensated for by over-machining to derive a particular desired dimension or contour. It is obvious that such techniques have a number of disadvantages including the frequent requirement to over-dimension the unfinished work piece, over-machine those work pieces which fall within the oversize tolerance range and the provision of relatively costly and time-consuming means for securing or prepositioning the work relative to the tool prior to initiating an operation thereon. Furthermore, changes in setup are frequently required when work is fed to the tool having minor variations in its shape.

It is, accordingly, a primary object of this invention to provide an apparatus and method for predeterminately operating on work-in-process whereby the surface of the work to be performed on is first automatically located by movement of the tool and/or work prior to the initiation of an automatic tool operating cycle.

Another object is to provide a new and improved automatic production apparatus employing program control means for controlling the operation of a tool in a predetermined cycle of movement in machining or otherwise operating on work which program control means is not brought into operation until the surface of the work to be operated on is predeterminately located by a sensing means which is mounted on or associated with the tool head itself so as to predeterminately indicate the relative location of the tool and work.

Another object is to provide an automatic sensing means associated with a machine tool head or the tool itself for sensing the surface of a work piece just prior to the machining operation after the work is positioned relative to the tool for performing preprogrammed operations thereon so as to compensate for variations in shape and dimension of the work from piece to piece.

Another object is to provide an improved apparatus and method for performing preprogrammed operations on different work pieces having different initial dimensions without the need for specially locating each work piece or providing different fixtures for predeterminately securing each work piece of different dimension relative to the machine tool.

Another object is to provide a new and improved system for machining work wherein the work is first generally located with respect to the tool, then the tool or work is further located by means of an automatic sensing means after which corrections are made in the relative positioning of the tool and work prior to performing preprogrammed operations on the work so as to compensate for variations in the shape or tolerance of different work pieces.

Figure 2:
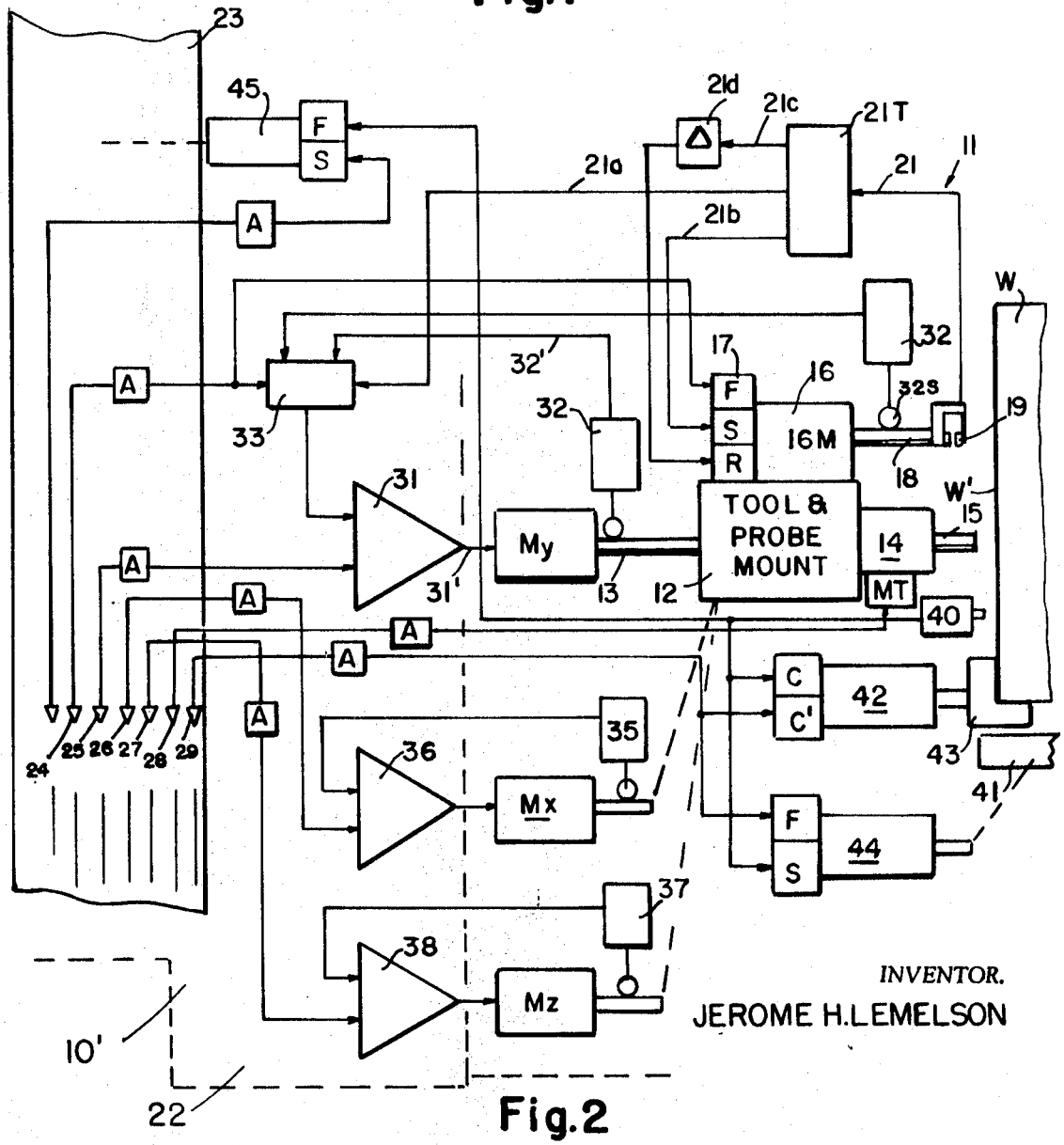
Figure 3:
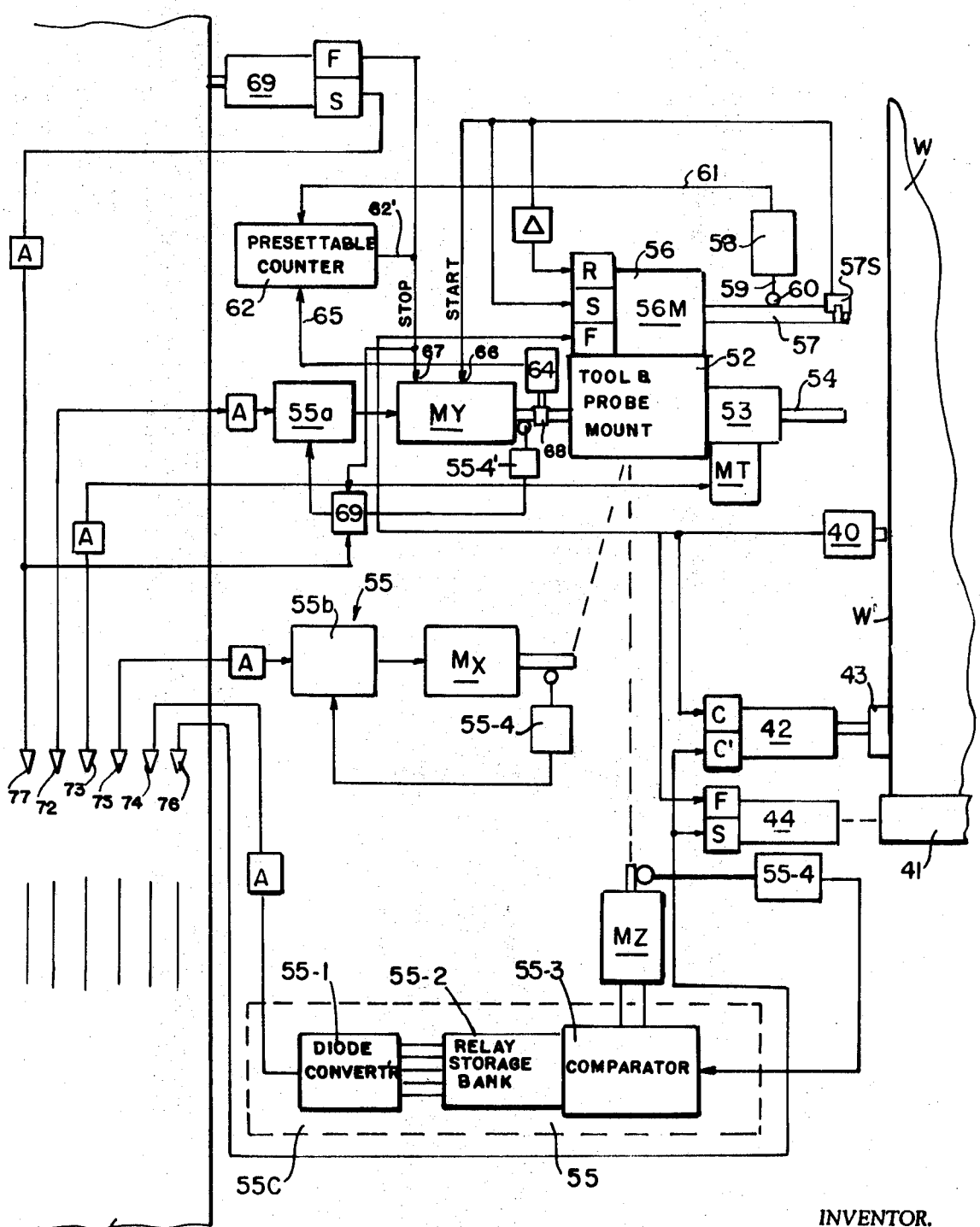

The nature of the invention, as to its objects and advantages, the mode of its operation and the manner of its organization, may be better understood by referring to the following description taken in connection with the accompanying drawings forming a part thereof in which:

FIG. 1 is a block diagram illustrating the basic subsystems and components of the system comprising the instant invention;

FIG. 2 is a schematic diagram showing further details of automatic control apparatus employing feedback and reproduced analog signals to control a production machine and means for automatically predeterminately locating the surface of a work piece to be machined prior to the operation of said automatic control apparatus; and FIG. 3 is a schematic diagram of an automatic machining system coming within the realm of the instant invention and employing digital techniques to effect automatic machine tool control after the work piece and machine are predeterminately located.

In order to simplify the control diagrams illustrated in the drawings and described hereafter in the body of the specification, book diagram notations are provided to illustrate known electronic and electro-mechanical operating and control components as well as electronic control sub-systems. To further simplify the diagrams, power supplies have been eliminated and it is to be assumed that the correct power supplies are provided on the proper sides of all amplifiers, switches, signal generators, relays, motors, controls for said motors and servo devices to properly operate the illustrated systems.

While the systems provided to automatically preposition the machine tool and a selected surface of a work piece define means for moving a probe towards the work piece and thereafter controlling movement of the tool itself into engagement with a selected surface of the work piece prior to performing a program controlled machining operation, it is to be understood that the control system may be modified to provide for movement of the work piece towards the tool to preposition the two with respect to each other prior to performing an automatic machining cycle. While the tool is taught to be driven along one or more axes in performing on the work piece, it is obvious that the work piece itself may also be driven in one or more directions while the tool is held stationary or concurrently with the predetermined movement of the tool and these operations may be effected by modifying the apparatus described.

In the apparatus defined in the drawings, a probe is mounted adjacent to the head of the machine tool and is automatically projected until it engages or comes proximate to a surface of the work piece, the signal generated during the movement of the probe being operative thereafter to effect prepositioning of the tool against or adjacent to the work piece prior to performing a preprogrammed machine operation. It is to be noted that the described motor-driven probe may, in certain instances, be supplemented or replaced by other means for detecting and indicating the distance of the work piece surface from the machine head or tool tip. For example, photoelectric means may be provided to indicate by reflection or light interruption means the location of the surface of a work piece. Signal or pulse echo means employing radiation such as ultrasonic wave energy, micro-wave energy or other forms of radiation may also be provided on a mount adjacent to the tool head and supported thereby or by the frame of the machine tool. Variations in the received radiation signal may be measured and utilized to determine the distance between the transmitting device or tool and the surface of the work piece.

The apparatus described hereafter may also be provided with short wave surface detection means such as radar means supported by the tool head, tool chuck or a mount adjacent to the tool as provided hereafter for detecting and measuring not only the location of the surface of the work to be machined but, in certain instances, the location of the tip of the tool itself so as to automatically indicate tool wear, and, by the medium of feedback signal generation and computing means as defined, correct for same to predetermine the machining operation.

In a modified form of the invention, the same probe utilized to detect the surface of the workpiece may also be operative to detect and measure or indicate the location of the tip of the tool from the tool head so as to further account for variations in same to predetermine the machining operation. The signals so generated in detecting the tip of the tool may be fed to a summing amplifier receiving signals generated in detecting the surface of the work so as to determine the distance between the tool tip and the work surface prior to initiating an automatic machining cycle.

Referring first to FIG. 1 of the drawings, a machine tool control system 10 is provided and includes a machine tool 11 having supported thereby an apparatus for sensing the location of a surface of a work piece W disposed adjacent said tool, said sensing apparatus comprising an assembly including a servo motor 16 operative to project and retract a probe arm defined in part as an output shaft 18 thereof having disposed at its far end a surface-sensing transducer 19 which is operative to generate a feedback signal upon sensing either by contact or otherwise, a surface of the work W. The feedback signal generated when the surface-sensing transducer 19 senses or contacts the surface of the work is transmitted to an automatic controller 20 which thereafter automatically controls the operation of the surface-sensing servo 18 in a manner to prevent further projection of the output shaft 18 of said servo and also generates a signal which is transmitted to a program controller 22 operative thereafter to control the operation of the machine tool 11.

The tool thereafter performs a preprogrammed operation on the work such as a machining operation in response to signals generated by the tool program controller 22, such signals being operative to predeterminately control movement and operation of one or more components of the tool to cut or otherwise perform on the work after the location of the tool and the work surface has been automatically determined by the controller 20 which senses or calculates the degree of movement or projection of shaft 18 as will be hereinafter described.

FIG. 2 illustrates further details of the automatic machine tool system shown in FIG. 1 whereby analog signals are utilized to effect tool positioning and control. The apparatus 10' includes an assembly 11 of operational tool elements and an automatic control system 22 for controlling said tool elements. The tool elements include a plurality of servo motors designated Mx, My and Mz which are operative to respectively control positioning of a mount such as a column 12 on which one or more tool heads 14 and a probe 16 are mounted. The tool head 14 includes a cutting tool or other form of tool operational device 15 which is rotationally or otherwise driven or operated by a motor MT supported by the tool head or mount therefore. The motor My is a reversible gear motor operative to drive the tool column or mount 12 in a direction to move the tool head horizontally towards and away from a surface of the work piece W such as normal thereto or normal to a plane facing the tool head. The motor Mx is a reversible gear motor coupled to the mount 12 and operative to drive said mount and tool head in both directions parallel to said surface W' of said work piece or said plane. The motor Mz is a reversible gear motor coupled to the tool mount 12 which is operative to drive said mount and tool head vertically upwardly and downwardly. By predeterminately controlling the operation of the motors Mx, My and Mz, as well as the operation of the tool motor MT, the tool may be driven in any predetermined path in the realm of its motion and its operating device or cutting tool 15 may be utilized to perform a variety of predetermined operations. Each of said motors is operated in accordance with variations in analog signals generated on the outputs of comparator devices such as summing amplifiers denoted 31, 36 and 38 which are respectively connected to receive command control and feedback signals as will be described. Variations in the locations of the output shafts of the motors Mx, My, Mz, 16M and, in certain instances, MT, are electrically indicated by means of respective Selsyn generators 32, 35 and 37 having their output shafts coupled to rotate with the output shafts of said motors and operative to generate variable analog signals in accordance with the degree of movement of said shafts. Command control signals for controlling said servo motors are generated from analog recordings provided on a magnetic tape 23 or other medium comprising part of the automatic control system 22.

To further describe the apparatus 10' of FIG. 2, a typical operational cycle will be described. The work W is fed to a location immediately adjacent the tool apparatus 11 on a conveyor or other work transport apparatus designated by the notation 41. A controllable motor 44 or a plurality of motors may be utilized to control the transfer apparatus 41 to feed and preposition units of work, one at a time, at a predetermined location such as a clamping fixture 43 located adjacent the operating head 14 of the tool. A sensing device such as a limit switch 40 senses the appearance of a work unit W at the fixture 43 and generates a control signal which is simultaneously fed to the servo motor 44 for operating the clamping fixture 43 to preposition and secure the work or its holder on the fixture and to the start control F of a motor 45 operative to drive the recording member or tape 23 past a plurality of reproduction transducers 24 to 30 operatively coupled to different channels of the recording member for generating control signals in sequence for automatically controlling the machine apparatus 11 to perform preprogrammed operations on the work W.

A start signal recording on the first channel of the recording member 23 is first reproduced by the transducer 24 and amplified by a reproduction amplifier A from which it is transmitted to the start control F for the probe motor 16M and to a bi-stable switch 33 which is switched thereby to complete a circuit between the output 32' of a Selsyn generator 32 and an input to a summing amplifier 31. Said summing amplifier 31 receives a first reference signal generated and reproduced from an analog signal recording on the recording member 23 by a transducer 25 and a second signal generated by the Selsyn generator 32 which is coupled to the probe arm 18 and provides a feedback signal in accordance with the movement of said probe arm. The output 31' of the summing amplifier is fed to control the tool positioning motor My having its shaft 13 coupled to move the tool mount 12 and head 14 towards the surface W' of the work W. The signal generated by the Selsyn generator 32 is thus bucked against the reference signal generated as reproduced from the recording member 23 and the result is to effect a controlled movement of the tool head towards the work. A transducer 19 mounted at the end of probe arm 18 is operative to sense the surface W' of the work W by being driven into contact with or positioned in the immediate vicinity of said work surface W'. The transducer 19, which is illustrated as a limit switch having contacts 19c, may comprise any suitable surface-sensing device employing contact, magnetic, induction, capacitance or even fluidic means to sense the work surface and its output 21 which becomes energized on contacting or sensing said work surface is connected to a transformer 21T shown having several control outputs. A first output 21a of transformer 21T is connected to a switching input of a bi-stable switch 33 which is operative to switch the output of a second Selsyn generator 34 coupled to the shaft 13 of the tool positioning motor My to the input of the summing amplifier 31 and to disconnect the output 32' of the Selsyn generator 32 from said input to said summing amplifier 31 so that as the motor My is operated thereafter in positioning the tool 14 to perform preprogrammed operations on the work, a feedback signal indicative of the movement of the shaft 13 may be generated and bucked against the command control signal reproduced from recording member 23 to effect said preprogrammed operation of motor My. It is to be noted that such operation occurs only after the tool head 14 has been predeterminately located with respect to the surface W' of the work W by the signals previously generated from the recording member 23 and the Selsyn generator 32. In other words, the initial stage of tool control comprises movement of the tool to a predetermined position or distance from the work surface in accordance with the degree the output shaft 18 of the probe 16 has moved to sense or contact said surface after which the preprogrammed automatic control of the tool and its positioning motors Mx, My and Mz is automatically effected.

A second output 21b from the pulse transformer 21T extends to the stop control S of the probe motor 16M which effects stoppage of the probe when its sensing tip or transducer 19 is in direct engagement or immediately adjacent the work surface W'. A third output 21c of transformer 21T is connected to a time-delay relay 21D the output of which is connected to the reverse drive control R or motor 16M which becomes energized shortly after the motor has stopped and the probe shaft 18 is driven back into the housing of the probe device 16 to a home position at which the probe motor automatically stops, a function which may be effected by means of a limit switch mounted within the probe housing and engaged by a protrusion or pin on shaft 18 when said shaft is fully retracted, said limit switch being operative to pulse the stop control S of motor 16M.

After tool positioning motor My has driven the tool head and mount 12 to position the tool 15 engaging or immediately adjacent the work W and switch 33 has been activated to connect the Selsyn generator 32 coupled to the shaft 13 of motor My, command control signals recorded on recording member 23 at a location whereby they will be produced only after the time interval necessary to fully extend the probe shaft 18, are reproduced by reproduction heads 25, 26 and 27 and are fed to inputs of respective summing amplifiers 31, 36 and 38 which are connected to control motors My, Mx and Mz. Selsyn generators 35 and 37 are respectively connected to operate off the shafts of gear motors Mx and Mz and generate feedback signals to the summing amplifiers 36 and 38 which are bucked against the command control signals reproduced from the tape so as to insure that said motors operate in accordance with the characteristics of said reproduced command control signals. A signal generated by a reproduction transducer 28 operatively coupled to still another track of the recording member 23 is fed to predeterminately operate the motor MT which drives the tool. Said signal may comprise a simple pulse signal or series of pulse signals operative to start and stop the motor MT or may control said motor by means of a Selsyn generator and summing amplifier applied as in the control of motors My, Mx and Mz as described. Additional motors and similar control means therefore may also be provided for further positioning the work and/or tool relative to each other to provide preprogrammed operations of the tool and relative movements of tool and work.

At the end of an operational cycle as determined by the signals recorded on recording member 23, a sixth reproduction transducer 29, operatively coupled to still another track of the recording member, reproduces a recorded signal and generates a pulse on two circuits, one of which is connected to the stop control S of motor 45 for stopping the drive of the recording member 23. A second output of the reproduction amplifier A for the reproduction pick-up 29 is connected to a control C' for clamping servo 42 which is operative to effect unclamping of the work held in the clamping fixture 43 and a third output of pick-up 29 connects to the start control F of the motor 42 operating the transfer or conveyor apparatus 41 for transferring the work W away from the station defined by the described apparatus 19'.

The system described above may be advantageously utilized where variations exist in the dimensions or shape of the work from one piece to the next or the manner in which it is secured to a work-holding device such that the surface W' may not always be predeterminately located within the desired tolerance limits with respect to the tool 15 or its mount.

FIG. 3 illustrates an automatic control system of the type described utilizing digital techniques for controlling tool operation. The apparatus will be described in terms of a typical operational cycle. Individual units of work W are fed to a clamping fixture 43 which is operated by a servo motor 42. A sensing relay or limit switch 40 senses the appearance of the work W at the clamping fixture 43 and, upon becoming activated by movement of the work to its vicinity or against the actuator thereof, transmits control signals, as in FIG. 2, to activate the clamping motor 42 for operating the clamp to engage and secure the work or its holding fixture and to deactivate or reverse the operation of the motor 44 operating the work transfer mechanism 41 by energizing a stop control S thereof.

The tool includes a mount or base 52 supporting the tool head 53 and a probe assembly 56 having an output shaft 57 projectable therefrom preferably parallel to the tool 54 by a reversible probe drive motor or actuator 56M which is supported adjacent to the tool head 53. Motors My, Mx and Mz are reversible, constant-speed motors each of which is controlled in its operation by means of a controller or computing device 55. Controller 55c is illustrated in detail and includes substantially the same components or sub-systems found in the other controllers 55a and 55b respectively controlling motors My and Mx. Digital command signals are reproduced as a digital pulse train defined by recordings on respective channels of the recording member 70 which may comprise a punched or magnetic tape. For the control of motor Mz, a reproduction transducer 74 reproduces command control messages in the form of digital pulse recordings from the recording member 70, feeds same to a reproduction amplifier A, the output of which is connected to a diode converter 55-1 which converts the series pulse trains to parallel codes which are set up in relay storage in a relay storage bank 55-2 containing precision resistors. The contacts of the storage unit relays set up the resistance bank in unit 55-2 so that the value set-up is proportional to the digital information recorded on the channel of the recording member or tape 70 which is scanned by the reproduction transducer 74. The relay storage unit 55-2 introduces a resistance proportional to the numerical value of the signals reproduced from the tape into a self-balancing bridge which forms part of a comparator device 55-3. A feedback signal is generated during the operation of the motor Mz by means of a response potentiometer 55-4 which is coupled to the shaft of the controlled motor Mz and is used to control the operation of said motor until the bridge is balanced or a null condition exists whereupon the motor will stop with the tool mount and head 53 predeterminately located with respect to the work. Of course, as additional signals are generated on the output of the reproduction transducer 74, the motor Mz will continue to operate in accordance with the value of said signals to define either point-to-point positioning control of the tool head and mount for continuous movement control thereof as one or more of the other motors My and Mx driving said tool are simultaneously or sequentially operated therewith. Reproduction head 72, riding on another channel of the tape 70, reproduces series digital command signals as the recordings thereof come into operative relationship with said pickup head and said signals are fed to operate controller 55a controlling motor My. Similarly, other signals recorded as digital pulse trains on another channel of the recording member 70 are fed to a controller 55b similar to controller 55a which controls operation of the motor Mx in driving the tool head mount 52 in a direction normal to the directions the motors My and Mz drive said tool head mount to provide predetermined three-axis positional control of said tool head and mount. As stated, activation of the work detecting limit switch 40 is operative to generate a pulse for energizing the start control F of probe motor 56M, causing the probe arm 57 to be driven outwardly from the housing 56 towards the surface of the work from a retracted position. A rotary limit switch 58 has its output shaft 59 operatively connected through gears 60 to the shaft or probe arm 57 and operates to generate pulses on its output 61 in proportion to the degree of movement of said shaft 57 outwardly from the housing 56. The pulses so generated are fed to the input of a predetermining counter 62 and are utilized to preset said counter in accordance with the number of pulses so generated. A surface-sensing transducer or limit switch 57S mounted at the end of probe arm 57 becomes activated upon contacting or otherwise sensing the surface W' of the work or a holder for the work and generates a signal on its output which is transmitted over suitable circuitry to the stop control S of probe arm drive motor 56M and to a start control 66 for the motor My. The motor My thereafter operates to drive the tool and probe mount 52 toward the work. A pulse generator in the form of a rotary limit switch 64 is operatively connected through gears 68 to the output shaft of motor My and generates pulses in proportion to the number of rotations of said motor, said pulses being generated on an output circuit of switch 64 and fed to uncount counter 62 which had previously derived a plurality of set-up counts generated by switch 58.

Upon uncounting of the predetermining counter 62, its output 62' becomes energized and a signal is generated thereon to the start control F of the motor 69 driving the recording member or tape 70 past the transducer heads. The output 62' of counter 62 is also connected to the stop control 67 of motor My which remains deactivated until signals are reproduced by pickup transducer 72 and transmitted to the automatic controller 55a for the motor My. Thereafter, as the recording member 70 moves past the various reproduction heads 72–77, signals are generated to effect automatic control of the motors Mx, My and Mz and the motor MT for predeterminately operating the tool 53 until a predetermined operation has been performed such as a machining, grinding, forming, depositing, welding or other operation on the work. Upon termination of said pre-determined operation and, preferably after the motors Mx, My and Mz have been reversibly operated by signals generated as reproduced from the recording member 70 so as to preposition the tool probe 52 a distance away from the next work piece to be fed to the clamping fixture 41, and after the last signal has been reproduced by pickup head 76 for stopping or predeterminately operating the tool motor MT, a signal is reproduced by a sixth head 77 coupled to a sixth channel of the recording member 70 and is transmitted to the stop control S of tape drive motor 69. A pick-up head 76 thereafter reproduces a control signal from another channel of the tape 70 which signal is transmitted to the reverse control C' for motor 42 to effect operation of the work clamp 41 in unclamping work and to the control F for reversibly driving motor 44 to operate conveyor or work transfer device 41 for carrying the work away from the machine.

It is noted that the tool motor MT shown controlled by signals reproduced from tape 70 by a pick-up head 73 may be operated to start and stop per se or may be predeterminately varied in its operation during the preprogrammed operational cycle by means of variable signals such as command control codes reproduced from the recording member 70 and fed to a controller similar to that defined by notation 55c. Each of the motor control systems includes a response potentiometer similar to 55–4, a comparator similar to 55–3, a relay storage bank or banks similar to 55–2, a diode converter similar to 55–1 and a reproduction amplifier A comprising the automatic controllers defined by notations 55a, 55b and 55c.

It is also noted that the switch 64 operating off the output shaft of motor My may operate to uncount the presettable counter 62 to correctly locate the tool 54 at the surface W' of the work W prior to initiating a program controlled cutting action and may also operate to feed pulses to the input of the comparator controller 55a functioning in the manner of the described pulse generators 55–4 in the feedback control loops for motors Mx and Mz. In FIG. 3, however, a separate pulse generator 55–4' is provided coupled to the output shaft of motor My and is operative to generate the described feedback pulses to the comparator device of controller 55a. As it is not desirable to generate pulses for the comparator of unit 55a while the motor My is operating in the act of prepositioning the tool 54 with respect to the surface of the work W prior to effecting a numerically controlled machine operation, a bistable switch 69 is provided between pulse generator 55–4' and the input to controller 55a. Switch 69 is closed by a pulse generated on the output of counter 62 when said counter uncounts as the tool 54 is driven adjacent or into engagement with the surface of the work. Switch 69 is opened by a reproduction of the stop-cycle signal generated by head 77 in reading the end-of-cycle recording on its channel of the tape so that operation of motor My during the next operation in prepositioning the tool 54 with respect to another surface of the work or another work piece may be effected without affecting the comparator unit 55–3 of controller 55–a.

While the automatic tool control systems shown in FIGS. 2 and 3 utilize a separate probe mounted on the tool mount or tool head and operative to project and sense the location of the work surface, it is noted that the probe may comprise a transducer either mounted directly on the tool 15 or may comprise in part said tool. For example, if the tool 15 is a drill or milling cutter, it may have an electrical transducer such as a strain gauge, electrical force operated transducer, miniature photo-electric cell, miniature magnetic or induction detector or the like embedded therein preferably at or near the leading end portion thereof for detecting the work surface or a drill, milling cutter or other form of tool may have a bore extending axially therethrough through which bore a fluid such as air, coolant or cutting liquid may be flowed in the direction of the work. Back pressure generated in the stream of said fluid as the result of the end of the tool at which the bore terminates being driven against or in the immediate vicinity of the work surface, may be utilized to operate a transducer or a fluid amplifying device mounted in the tool or in the tool head supporting said tool. The signals so generated may be transmitted as feedback signals to indicate to the control apparatus that the tool is in contact with or immediately adjacent the surface of the work and, by means as described, may be used to initiate operation of the means generating command control messages such as the described motors for driving the tapes 23 or 70 for moving the recording channels and recordings thereon past the reproduction transducers operatively connected to control the various motors thereafter for predeterminately controlling the tool as described. In other words, in FIG. 2, if the probe assembly 16 is replaced by a transducer mounted within or defining the tool 15 itself, the limit switch 40 detecting the presence of the work at the clamping fixture may be operative to generate a signal for starting one or more of the servo motors to drive the tool mount and tool towards the work until detection of the work surface by the transducer in the tool or the tool itself is effected. The signal so generated then initiates the means generating command control messages for automatically and predeterminately controlling the movement and operation of the tool thereafter (i.e.—once a base has been determined by means of the tool being prepositioned relative to the surface of the work). If the tool 15, its head 14 and/or the mount 12 can be electrically insulated and connected in a capacitance relay circuit whereby the work serves as a ground, a thyrotron or similar semi-conducting circuit may be utilized to generate a signal upon capacitance detection of the work surface and said signal may be utilized as the described feedback signal initiating operation of the motor driving the recording member containing the command control recordings and, in certain instance, stopping operation of the tool positioning motor until a signal is reproduced from the recording member for further controlling the operation of said motor in accordance with the preprogrammed operational cycle as defined by the command control recordings reproduced from the recording member.

In another form of the invention defined in FIG. 3, control of the tool apparatus to effect prepositioning of the tool 54 at the surface of the workpiece just prior to initiating the program controlled tool movement and operation may be effected by driving the probe arm 57 until the transducer 57S at the end thereof engages or otherwise senses the surface W' of the workpiece, whereupon the probe movement is stopped as described. Thereafter the surface sensing signal is utilized to initiate operation of the motor My driving the tool mount 52 to move the tool 54 towards the work surface W' and at the same time moving the probe drive unit 56 towards the surface W'. If the end of the probe arm 57 is in engagement with the surface W' the arm 57 will be driven backwardly into the probe drive unit or housing 56 as the motor My advances the assembly towards the work. Detent means (not shown) may be provided on the probe arm 57 to actuate a limit switch when said probe arm is at such a location with respect to its housing or the tool and probe mount 52 that the tool 54 will be in engagement with or immediately adjacent to the surface of the work W. Said limit switch may be mounted on or within the housing containing the probe drive motor 56M or the tool and probe mount 52. The closure or activation of said latter limit switch may be operative to generate a control signal which is used to stop the operation of motor My and/or to initiate reproduction of the recorded command control signals provided on the tape 70 by initiating operation of the drive means therefore, motor 69. Thereafter the preprogrammed cycle may continue as described. However, to assure that the end of probe 57 will be clear of the surface of the work during the machining operation, it may be automatically controlled and driven further into the housing 56 by the motor 56M by connecting the signal output of the latter mentioned limit switch to the reverse control R of motor 56M so that said motor thereafter drives the probe fully into said housing. This mode of control may be similarly applied to the apparatus and control system shown in FIG. 2. Photoelectric reading means may also be used to scan the probe arm 57 and a marker thereon located to provide said signal initiating an automatic cycle of tool control when the degree of retraction of the probe arm is such that the tool is in engagement with or immediately adjacent to the surface of the work.

In yet another form of the instant invention, the described moving probe and transducer means supported at its end may be replaced by a range finding device such as a radar or microwave transmitter and receiver supported on the tool head and operative to transmit and receive short wave signals and feed same to a computing means for automatically determining the distance between said tool head and tool and the surface of the workpiece such as W'. The computing means may then generate signals for automatically controlling movement of the tool to engage or otherwise be predeterminately located with respect to the surface of the work prior to initiating said automatic program controlled cycle of machining operations on the work.

Also, it is to be noted that in addition to performing rotary cutting operations on the workpiece, the tool may operate in other modes to chemically or electrically machine, weld or otherwise perform preprogrammed operations on the work after the initial locating movements as described.

If short wave means such as radar is employed to detect and measure the distance to the work surface, it may also be utilized to detect and locate the tool tip or otherwise measure the tool to determine its dimensions, degree of wear, etc. This may be effected by automatically moving or rotating the same transmitter and receiver unit on the probe arm or tool head or by providing separate radar or microwave units to measure tool length or detect tool tip location and to measure the distance to the surface of the work.

The probe arms 18 and 57 of FIGS. 2 and 3 may also be modified to contain a transducer operative to sense the end of the tool when said transducer is brought into operative engagement with said tool end or otherwise senses same. For example, said probe arm may be rotatable by an automatically controlled servo motor mounted in the housing 56 and the tool sensing transducer may be mounted on a laterally extending support protruding outwardly from the probe arm a degree such that the transducer will be aligned with or sweep past the end of the tool 54 when the probe arm is properly positioned and rotated. The command controlled cycle to effect detection of the tool tip may include means operative to control motor 56M to drive the arm 57 so that the tool tip sensing transducer is located in front of the tool tip and means for controlling the probe arm rotating motor to cause rotation of the transducer to move past the tool tip and sense same as it sweeps past or to bring it in direct alignment therewith followed by retraction of the probe arm to cause the transducer to engage the end of the tool and in so doing, generate a signal for stopping said retraction movement of said probe and reversing travel of the probe and thereafter causing rotation of the probe arm to clear the tool. An automatic controller such as a multi-circuit timer or series of limit switches may be operative to control movement of the probe to a home position after the transducer engages the end of the tool while another automatic controller or series of limit switches operated by pins or detents associated with the respective drive shafts may be operative to move the probe arm to cause the probe mounted transducer to engage the tip of the tool. The output of the Selsyn or pulse generators 32, 58 may be fed to a suitable computing means which computes the distance travelled by the probe until the transducer senses the end of the tool and thereby determines the location of the tool.

The same or an auxiliary computing means may receive signals indicative of the distance travelled by the probe in sensing the surface of the work and by summing or otherwise operating on the signals generated in sensing both tool tip and work surface location, the precise distance between the tool tip and work surface may be computed and used to automatically control the tool thereafter in locating same for performing preprogrammed operations on the work. The computing means may also compare the signals derived in locating the position of the end of the tool with a reference signal indicative of the tool tip location without wear by feeding said signals to a comparator device such as described summing amplifier, the difference signal being indicative of the amount of wear or mal-adjustment of the tool. When said difference signal equals or exceeds a predetermined quantity an alarm may be energized to indicate the need to change or sharpen the tool or readjust same. Said difference signal may also be utilized to automatically effect a tool changing or tool sharpening function by automatic machinery associated with the machine tool being controlled.

The probe arm containing the tool tip sensing probe may also contain other means for automatically inspecting the condition of the tool prior to each machining operation or at selected times during the operation of the tool. Inspection means such as profile sensing means, radiation generating and receiving means, ultrasonic inspection means, etc. may be mounted on said probe arm or said lateral extension thereof to be brought adjacent to or in engagement with a selected portion or portions of the tool for automatically inspecting same for wear, damage or flaws, and generating output signals indicative of such variables which signals are fed to analyzing and computing means as described.

I claim:
1. A machine for performing operations relative to work which is positioned adjacent said machine comprising in combination:
(a) a tool support having a tool mounted thereon operative to perform on a work piece,
(b) means for positioning said tool support at a first location relative to a work piece,
(c) a surface-sensing probe movable with respect to said tool support,
(d) transducing means forming part of said probe,
(e) said transducing means adapted to become activated upon sensing a surface of said work piece,
(f) means for relatively moving said surface-sensing probe and said work piece to bring said probe and the surface of said work piece proximate to each other,
(g) means for generating signals indicative of movement of said probe and said work piece together,
(h) first control means operatively connected to said probe transducing means for uncoupling said means relatively moving said surface-sensing probe,
(i) second control means for utilizing the signals generated during said relative movement until the activation of said transducer upon sensing said work piece surface to control movement of said tool from said first location to a second location so as to preposition said tool with respect to said work piece prior to performing on said work piece, and
(j) program control means for operating said tool at said second location to perform preprogrammed operations on said work piece.

2. An apparatus in accordance with claim 1, said tool support comprising first and second support means, a tool head supported by said second support means, said probe being movable with said tool head and also supported by said second support means, first servo means supported by said first support means for projecting said tool head and probe towards a work piece, said probe including a probe are movable relative to said tool head and a motor for projecting said probe arm towards a work piece, said probe being operative to sense and generate a signal upon sensing the surface of a work piece in the immediate vicinity thereof, means for using said signal to terminate the operation of said second servo means to stop the probe movement towards the work piece and to initiate operation of said second control means to control movement of said tool from said first location to said second location.

3. Apparatus in accordance with claim 2, said surface-sensing means being mounted directly at the end of said probe arm, said tool comprising a rotating cutting tool, said probe arm being movable substantially parallel to the axis of rotation of said tool, and means for retracting said probe arm after it has sensed the surface of a work piece to a home position.

4. Apparatus in accordance with claim 2, said means for generating signals indicative of the movement of said probe comprising a Selsyn generator coupled to operate as the probe moves and generate a feedback signal, and means for generating a reference signal, a comparator device, means for feeding said feedback signal and said reference signal to said comparator device for operating on said signals and generating a difference signal and means for utilizing said different signal to control operation of said first servo device for moving said tool from said first location to said second location.

5. Apparatus in accordance with claim 2, said program control means including a recording member having a plurality of command control recordings on different channels thereof and a plurality of reproduction transducers including at least one transducer operatively connected to reproduce recordings from each of said channels, a plurality of servo motors for operating said tool and driving said tool in a plurality of different directions, control means for each of said servo motors, and means for feeding the outputs of said transducers to respective of said control means for predeterminately controlling said servo motors after said tool has arrived at said second location whereby the tool may perform predeterminately on the work piece from said second location.

6. Apparatus in accordance with claim 1, said surface-sensing probe being operatively supported by said tool and movable therewith for sensing the surface of a work piece disposed in the immediate vicinity of the tool.

7. An apparatus in accordance with claim 1, said surface-sensing probe being mounted near the end of said tool for detecting a surface of the work piece against which the tool is driven.

8. An apparatus in accordance with claim 1, said surface-sensing probe defined by a bore extending through said tool and defining an orifice at the end of said tool and means for ejecting a fluid through said bore from said tool and detecting variations in the flow of the ejected fluid when a surface is brought into the immediate vicinity of the end of said tool, said detecting means including means for generating a signal indicative that the tool and surface of said work piece are immediately adjacent each other and operative for controlling said first control means.

9. An apparatus in accordance with claim 1, said surface-sensing probe including electrical means for generating a variable electrical signal as the probe approaches the surface of the work piece and means operative in response to variations in said variable electrical signal for reducing the approach speed of said probe and said work piece surface as the probe and work piece approach proximate to each other.

10. An apparatus in accordance with claim 1, said transducing means including a capacitance relay means operative to become activated when the probe is in the immediate vicinity of the work piece and to generate a feedback signal, and control means for stopping the relative movement of said probe and said work piece in response to said feedback signal.

11. An apparatus in accordance with claim 1, said transducing means including a photoelectric means responsive to light radiation reflected from the surface of said work piece.

12. An apparatus in accordance with claim 11, wherein light reflected from the surface of said work piece is masked upon driving said probe against said work piece surface, and control circuit means responsive to the drop in the output of said photoelectric means upon masking of the reflected light fed thereto for generating a control signal, said control circuit means being operatively connected to said first control means to feed said control signal thereto for uncoupling said means relatively moving said surface-sensing probe and said workpiece whereby said probe is stopped upon engaging the surface of said workpiece.

13. A machine for performing operations relative to work which is positioned adjacent said machine comprising in combination:
   a tool support having a tool mounted thereon and operative to perform on a work piece,
   means for positioning said tool support at a first location relative to a workpiece,
   a surface-sensing means associated with said tool for sensing a surface of a work piece when the tool is proximate thereto and generating a signal upon sensing said surface, means for relatively moving said tool and said work piece to bring the tool proximate to said surface of said work piece prior to the tool performing on the work piece,
   program control means for predeterminately operating said tool to perform a preprogrammed operation on said work piece,
   start control means for initiating operation of said program control means,
   said start control means being operatively connected to said sensing means and responsive to the signal generated by said sensing means when it senses the surface of the work piece so as to initiate operation of said program control means to thereafter control the operation of said tool to perform preprogrammed operations on said work piece when the tool is predeterminately located with respect to the surface of said work piece.

14. Apparatus in accordance with claim 13, whereby said surface-sensing means includes, at least in part, the tool itself.

15. An apparatus in accordance with claim 14, including electrical circuit means for detecting when the end of the tool engages the surface of the work and for generating said signal operative to initiate operation of said program control means.

16. Apparatus in accordance with claim 14, including a transducer associated with said tool and operative upon sensing the workpiece for generating said signal for initiating operation of said program control means.

17. A machine for performing operations relative to work which is positioned adjacent said machine comprising in combination:
   a tool support having a tool mounted thereon and operative to perform on a workpiece,
   means for positioning said tool support at a first location relative to a workpiece,
   a surface-sensing means including scanning means movable with respect to said tool support,
   transducing means forming part of said surface sensing means,
   said transducing means operative to become activated upon sensing a surface of a workpiece scanned by said scanning means and operative to generate a first signal indicative of its detection of said workpiece surface,
   means for causing said surface sensing means to scan work opposite said tool at said first location,
   means for generating second signals indicative of the degree said scanning means moves to sense said workpiece,
   first control means operative to receive said first signal and said second signals and applying same for controlling relative movement of said tool and workpiece to bring the tool proximate to the surface of said workpiece,
   master control means for operating said tool in a programmed sequence,
   second control means operative to activate said master control means to effect its control of the operation of said tool on the workpiece,
   means for generating a third signal when said tool is proximate to a workpiece as controlled by said first control means, and
   means for applying said third signal to said second control means to activate same and initiate operation of said master control means to program control the operation of said tool on said workpiece.

References Cited

UNITED STATES PATENTS

| | | | |
|---|---|---|---|
| 1,014,639 | 1/1912 | Colwell | 175—2 |
| 3,096,670 | 7/1963 | Stringer | 235—151.11X |
| 3,269,233 | 8/1966 | Lothmann | 235—151.11UX |
| 3,333,893 | 8/1967 | Heimaster | 299—1 |

ERNEST R. PURSER, Primary Examiner

U.S. Cl. X.R.

33—174; 77—32.2; 173—19; 235—151.11